US009405507B2

(12) United States Patent
Simonson et al.

(10) Patent No.: US 9,405,507 B2
(45) Date of Patent: *Aug. 2, 2016

(54) TABULAR DATA SORTING AND DISPLAY

(71) Applicant: Adobe Systems Incorporated, San Jose, CA (US)

(72) Inventors: Howard C. Simonson, San Jose, CA (US); Elizabeth Kricfalusi, Hyattsville, MD (US)

(73) Assignee: Adobe Systems Incorporated, San Jose, CA (US)

( * ) Notice: Subject to any disclaimer, the term of this patent is extended or adjusted under 35 U.S.C. 154(b) by 926 days.

This patent is subject to a terminal disclaimer.

(21) Appl. No.: 13/682,519

(22) Filed: Nov. 20, 2012

(65) Prior Publication Data

US 2014/0143260 A1     May 22, 2014
US 2014/0344291 A9     Nov. 20, 2014

Related U.S. Application Data

(63) Continuation of application No. 10/698,804, filed on Oct. 31, 2003, now Pat. No. 8,321,799.

(51) Int. Cl.
    *G06F 3/048*     (2013.01)
    *G06F 7/24*     (2006.01)
    *G06F 17/24*     (2006.01)

(52) U.S. Cl.
    CPC ............... *G06F 7/24* (2013.01); *G06F 17/245* (2013.01)

(58) Field of Classification Search
    CPC ...................................................... G06F 17/245

USPC .......................................... 715/764, 765, 767
See application file for complete search history.

(56) References Cited

U.S. PATENT DOCUMENTS

| 5,006,722 | A | 4/1991 | Adelson et al. |
| 5,396,621 | A | 3/1995 | MacGregor |
| 5,586,311 | A | 12/1996 | Davies et al. |
| 5,704,051 | A | 12/1997 | Lane et al. |
| 5,706,449 | A | 1/1998 | Liu et al. |
| 6,373,504 | B1 | 4/2002 | Nielsen |
| 6,738,770 | B2 | 5/2004 | Gorman |

OTHER PUBLICATIONS

Outlook, Microsoft 2000, Copyright 1995-1999, Fig. 1-13.*
"Eudora® Email," User Manual for Windows, Version 5.1, Copyright (c) 2001 by Qualcomm Inc., pp. 1-5.

(Continued)

*Primary Examiner* — Andrey Belousov
(74) *Attorney, Agent, or Firm* — Finch & Maloney PLLC

(57) ABSTRACT

A method and apparatus, including a computer program product, implementing techniques for displaying a table of data including a set of markers associated with rows or columns of the table, the table having one or more sort keys having a sort key order including a most significant sort key, each sort key being a row or column of the table; receiving a user input gesture selecting a marker; establishing the row or column associated with the user-selected marker as the most significant sort key, and maintaining the positions of the remaining sort keys in the sort key order; sorting the data using the sort key order; and displaying the sorted data. The techniques also include representing visually a sort key order for a table of data by displaying on a graphical user interface display one or more markers with a pattern of distinct visual properties.

18 Claims, 4 Drawing Sheets

(56) References Cited

OTHER PUBLICATIONS

"Eudora® Email," User Manual for Windows, Version 5.1.1, Copyright (c) 2001 by Qualcomm Inc.; http://www.eudora.com/techsupport/kb/2350hq.html; pp. 1-8.
Lotus Notes 4.6 (Sam's Teach Yourself Lotus Notes® 4.6 in 24 hours).
Outlook, Microsoft Outlook 2000, Copyright 1995-1999, Fig. 1-13.
Quattro Pro 6 (Quattro Pro 6 for Windows® for Dummies).
MS Access (See it done. Do it yourself™ EASY MS Access® 97).
MS Excel (The Complete Idiot's Guide™ to MS Excel 97).
"Windows Explorer (r), as bundled with Windows XP Professional (r) OS," Copyright (c) 1981-2001, pp. 1-6.

* cited by examiner

| Ordinal Number | Column Header Name | Sort Direction | |
|---|---|---|---|
| 1 | Area Code | Descending | 204a |
| 2 | Last Name | Ascending | 204b |
| 3 | First Name | Ascending | 204c |
| 4 | State | Descending | 204d |

FIG. 2a

| Ordinal Number | Column Header Name | Sort Direction |
|---|---|---|
| 1 | State | Descending |
| 2 | Area Code | Descending |
| 3 | Last Name | Ascending |
| 4 | First Name | Ascending |

FIG. 2b

| Ordinal Number | Column Header Name | Sort Direction |
|---|---|---|
| 1 | Zip Code | Ascending |
| 2 | Area Code | Descending |
| 3 | Last Name | Ascending |
| 4 | First Name | Ascending |
| 5 | State | Descending |

FIG. 2c

TABULAR DATA SORTING AND DISPLAY

This application is a continuation of U.S. patent application Ser. No. 10/698,804 (filed 31 Oct. 2003, now U.S. Pat. No. 8,321,799), the entire disclosure of which is hereby incorporated by reference herein.

BACKGROUND

The present invention relates to digital data processing, and more particularly to tabular data sorting and display.

Current systems provide numerous ways for a user to request the sorting of a table of data that is displayed to the user through a graphical user interface display. One common technique allows the user to click on the header of a column of data to request that the data be sorted using that column as the sort key in a default direction, i.e., either ascending or descending. Commonly, if the user clicks on the same header without having selected another sorting action, the sort direction is reversed. Other common techniques allow the user to select one or more columns, order them, and specify how each is to be sorted, e.g., in what direction and as text or numbers, through use of a user interface window with radio buttons, pull-down menus or the like.

SUMMARY

In general, in one aspect, the invention provides a method and apparatus, including a computer program product, implementing techniques for interacting with a user through a graphical user interface. The techniques can include displaying a table of data as an element of a graphical user interface display, display including a set of markers, each marker being associated with a row of the table or each marker being associated with a column of the table, the table of data having one or more sort keys having a sort key order including a most significant sort key and a least significant sort key, each sort key being a row or a column of the table; receiving from the user an input gesture selecting a marker; establishing the row or column associated with the user-selected marker as the most significant sort key, and maintaining the positions of the remaining sort keys in the sort key order; sorting the data using the sort key order; and displaying the sorted data.

The marker can be a column header or a row header. The user input gesture can be a selecting gesture for selecting the marker or a dragging gesture for selecting the marker by dragging the marker to an area on the graphical user interface display. The area on the graphical user interface display can be an icon or a sort key list window. The techniques can include representing the sort key order visually in the table by displaying the markers with a pattern of distinct visual properties. The pattern of distinct visual properties can be a set of distinct colors or a set of distinct non-textual representations of the sort key order.

The techniques can include receiving from the user an input gesture deselecting a marker associated with a sort key; and removing the sort key associated with the deselected marker from the sort key order while maintaining the positions of the remaining sort keys in the sort key order. The techniques can include determining whether the user-selected marker is associated with the most significant key, and if so, changing a sort direction of the most significant key.

The number of sort keys for the table of data can be limited to a predetermined number greater than one. For example, the table of data may have three or more sort keys. The techniques can include determining whether the table of data has the predetermined number of sort keys, and if so, removing the least significant sort key from the sort key order, establishing the row or column associated with the user-selected marker as the most significant sort key, and maintaining the positions of the remaining sort keys in the sort key order, and otherwise establishing the row or column associated with the user-selected marker as the most significant sort key, and maintaining the positions of the remaining sort keys in the sort key order.

The techniques can include receiving from the user an input gesture deselecting a marker associated with a sort key; and removing the sort key associated with the deselected marker from the sort key order while maintaining the positions of the remaining sort keys in the sort key order.

The techniques can include displaying a table of data as an element of a graphical user interface display, display including a set of markers, each marker being associated with a row of the table or each marker being associated with a column of the table, the table of data having one or more sort keys having a sort key order including a most significant sort key, each sort key being a row or a column of the table; receiving from the user an input gesture selecting a marker by dragging the marker to a location within an area of the graphical user interface display; establishing the row or column associated with the user-selected marker as a sort key having a position in the sort key order defined by the location within the area, and maintaining the positions of the remaining sort keys in the sort key order; sorting the data using the sort key order; and displaying the sorted data.

Advantages that can be seen in particular implementations of the invention include one or more of the following. The number of sort keys for the table can be unlimited. No menu or dialog box is required. A user enjoys a quick visual representation of the ordinal sequence in which sort keys have been applied to a table of data. One implementation includes all of the foregoing advantages.

The details of one or more embodiments of the invention are set forth in the accompanying drawings and the description below. Other features, aspects and advantages of the invention will become apparent from the description, the drawings, and the claims.

BRIEF DESCRIPTION OF THE DRAWINGS

FIGS. 2*a-c* each show a sort key order for a table of data.

Like reference numbers and designations in the various drawings indicate like elements.

DETAILED DESCRIPTION

Figure 1:
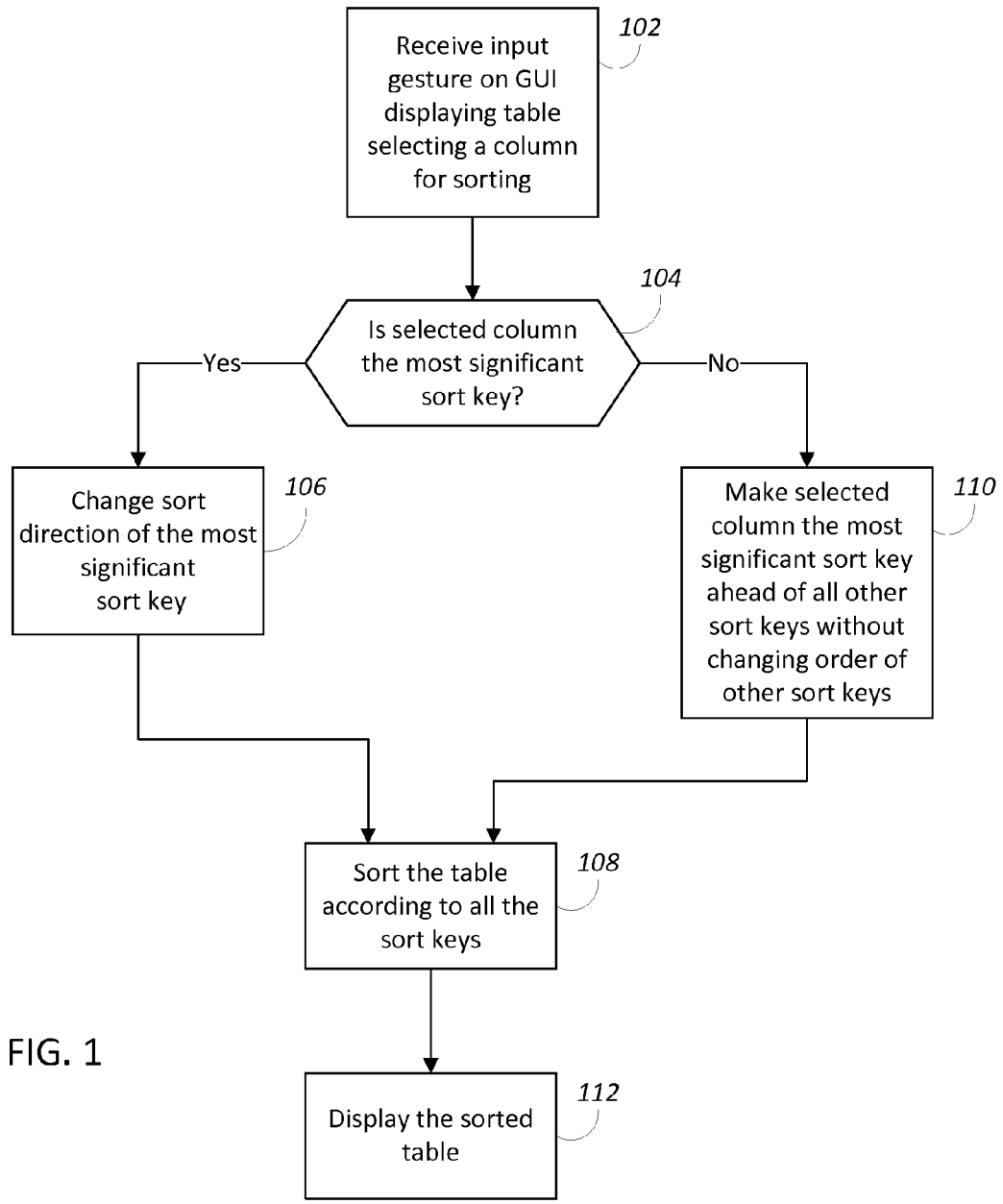
FIG. 1 shows a user interface process in accordance with the present invention.

FIG. 1 shows a user interface process 100 implemented in a computer program for interacting with a user requesting the sorting of a table of data.

The program displays a table of data, for example, a spreadsheet page, on a graphical user interface display. The table includes a grid in row and column format. At each row and column intersection, a box or cell is provided for entering, processing, and displaying information in a conventional manner. The table is displayed with column headers for some or all of the columns. Each column header will generally have a label including a descriptive text, e.g., "Last Name", "First Name", "State" and "Area Code" or icon; however, this is optional in the context of the user interface process 100.

Each column in the table may be selected as a sort key for use in sorting the data in the table. The program maintains a sort key order for the table. Initially, the sort key order may be empty. In one implementation, each column selected as a sort key has an entry in a sort key list that defines a sort key order. In the example shown in FIG. 2*a*, each entry 204*a-d* in the sort key list 202 includes information defining the ordinal position of its respective sort key in the sort key order ("Ordinal Number" 206), the label of its respective sort key in the table ("Column Header Name" 208), and the direction of the sort for its respective sort key ("Sort Direction" 210). For ease of description, the term "most significant sort key" refers to the sort key having the first position in the sort key order (i.e., Ordinal Number "1"), and the term "least significant sort key" refers to the sort key having the last position (i.e., Ordinal Number "4", if there are 4 entries in the sort key order). The most significant sort key is commonly referred to as the major sort key or the primary sort key. The program may be configured, by a program developer or a user, to sort the data in the table using the sort key order.

The program receives a user input gesture selecting a column in the displayed table for sorting (step 102). The user input gesture may be a single or double mouse-click, lightpen click, or the like, on a marker on the graphical user interface display. Each displayed marker (e.g., a row header or a column header) is associated with a row of the table or a column of the table. The user may click on a marker or highlight (through a drag-and-release operation) one or more cells of a column to select the associated column for sorting. For keyboard-only users, the program may provide navigation and keyboard actions that correspond to the mouse-actions described above—for example, the user may use the "Tab" button on the keyboard to navigate to the marker and then hit "Enter" to select the associated column for sorting.

In response to the user selection, the program determines whether the selected column is the most significant sort key (step 104). If so, the program changes the sort direction of the selected column (step 106), sorts the table of data according to the sort key order without any further action on the part of the user (step 108), and displays the sorted data (step 112).

If the selected column is not the most significant sort key, the program responds to the user selection by making the column the most significant sort key (step 110), sorts the table of data according to the sort key order without any further action on the part of the user (step 108), and displays the sorted data (step 112).

If the selected column was a sort key (i.e., the column was previously selected as a sort key and has an entry in the sort key list), the program changes the ordinal numbers of the sort keys in the sort key order so that the selected column is the most significant sort key while maintaining the remaining sort keys in their relative positions and sort directions. Say, for example, the user selects the column having the column header "State" in step 102. As shown in FIG. 2*a*, the selected column is (prior to selection) the least significant sort key. The program changes the ordinal numbers of the sort keys in the sort key order to make the selected column the most significant sort key, as shown in FIG. 2*b*.

If the selected column was not a sort key (i.e., the column was not previously selected as a sort key and does not have an entry in the sort key list), the program creates an entry for the selected column and designates the selected column as the most significant sort key. The program then changes the ordinal numbers of the remaining sort keys while maintaining the relative positions and sort directions of the sort keys in the sort key order. Say, for example, the user selects the column having the column header "Zip Code" in step 102. FIG. 2*a* shows that the selected column is not (prior to selection) a sort key. The program then creates an entry in the sort key list for the selected column and designates the column having the column header "Zip Code" as the most significant sort key, as shown in FIG. 2*c*.

The program generally sorts the table of data in real-time. That is, the data is sorted according to the modified sort key order as soon as the program receives the user input gesture selecting the column for sorting.

The program can be implemented to allow a user or a program developer to limit the number of sort keys for the table to a number less than n, where n is the number of columns or the number of rows that may be used as sort keys. Say, for example, the program is configured to limit the number of sort keys to four and the user selects the column having the column header "Zip Code" in step 102. The program determines that there are four sort keys in the sort key list and that the selected column is not (prior to selection) a sort key, as shown in FIG. 2*a*. The program removes the least significant sort key (i.e., the entry having the column header "State") from the sort key list, creates an entry for the selected column in the sort key list and designates the selected column as the most significant sort key. The program changes the ordinal numbers of the remaining sort keys while maintaining the relative positions and sort directions of the sort keys in the sort key order. The program then sorts the table of data according to the modified sort key order.

The program may also be configured to receive a user input gesture on the graphical user interface display removing a sort key from the sort key list. The user input gesture may be a single or double mouse-click, lightpen click, or the like, on a marker on the graphical user interface display. For example, the user may "option-click" on a marker. For keyboard-only users, the program may provide navigation and keyboard actions that correspond to the mouse-actions described above—for example, the user may use the "Tab" button on the keyboard to navigate to the marker and then hit "Delete" to remove the sort key associated with the marker from the sort key list. If necessary, the program changes the ordinal numbers of the remaining sort keys while maintaining the relative positions and sort directions of the sort keys in the sort key order.

Figure 3:
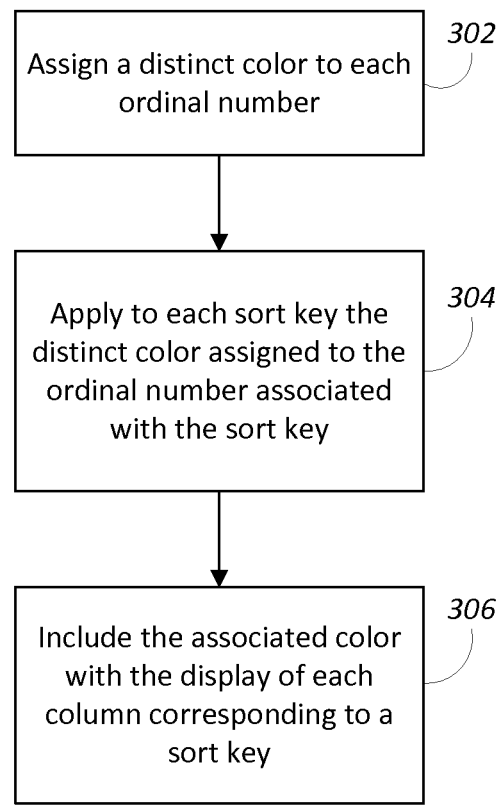
FIG. 3 shows a display process in accordance with the present invention.

FIG. 3 shows a display process 300 implemented in a computer program for displaying a table of data to a user using color to indicate how the data was sorted. The program assigns a distinct color to each ordinal number in the sort key order (step 302). The program applies to each sort key the color value assigned to the ordinal number associated with the sort key (step 304). The program then displays the table of data on a graphical user interface display, displaying the colors in some way with their corresponding sort keys (step 306). This produces a displayed table having a sort order that is represented visually using an order of colors.

In one implementation, a program developer defines the color space and two color value end-points to be used by the program in color-coding the table of data. The program then assigns one pre-defined color value to the ordinal number having the first position in the sort key order (i.e., Ordinal Number "1"), assigns the other pre-defined color value to the ordinal number having the last position in the sort key order (i.e., Ordinal Number "4", if there are four entries in the sort key order), and interpolates the intermediate color values as needed based on the number of ordinal numbers in the sort key order. In another implementation, the program developer defines a color-value start point, a step size, and a path through a color space to be used by the program in color-coding the sort key order. The program then assigns the pre-defined color-value start point to the ordinal number having the first position in the sort key order and takes steps of the pre-defined size along the pre-defined path to obtain one or more color values, which are then assigned to the remaining ordinal numbers in sequence. Once the color values have been assigned to the ordinal numbers, the program applies each assigned color value to some aspect of the sort key's column—for example, the column header background, column header text, column header icon, column background, or column border—corresponding to the ordinal number. Accordingly, the program applies different color values to a sort key as its ordinal position in the sort key order changes.

The program displays the table of data with the applied colors on the graphical user interface display. The effect is to provide the user with a quick visual representation of the ordinal sequence in which the sort keys have been applied to the table of data. In one implementation, the darkest shade of a color displayed on the graphical user interface display is applied to the most significant sort key and the lightest shade is applied to the least significant sort key. Other color-based representations of the ordinal sequence of the sort keys may be used. For example, the program may be configured to vary one or more aspects of a color (e.g., hue, saturation, brightness) so as to create a related set of colors that can provide the user with a visual representation of the sort key order. The program can be implemented to allow a user to configure the selection and application of colors.

The program can also be implemented to utilize markers having a pattern of distinct visual properties to provide a non-color-based visual representation of the sort key order. For example, the program may be configured to display (in the table of data) symbols of varying sizes (e.g., largest symbol is associated with most significant sort key and smallest symbol is associated with least significant sort key).

In all of the foregoing implementations, sort keys were selected by a user input gesture that selected a particular marker. In the following paragraphs, an alternative 30 implementation will be described in which a drag-and-drop user input gesture is used for the same purpose.

Figure 4:
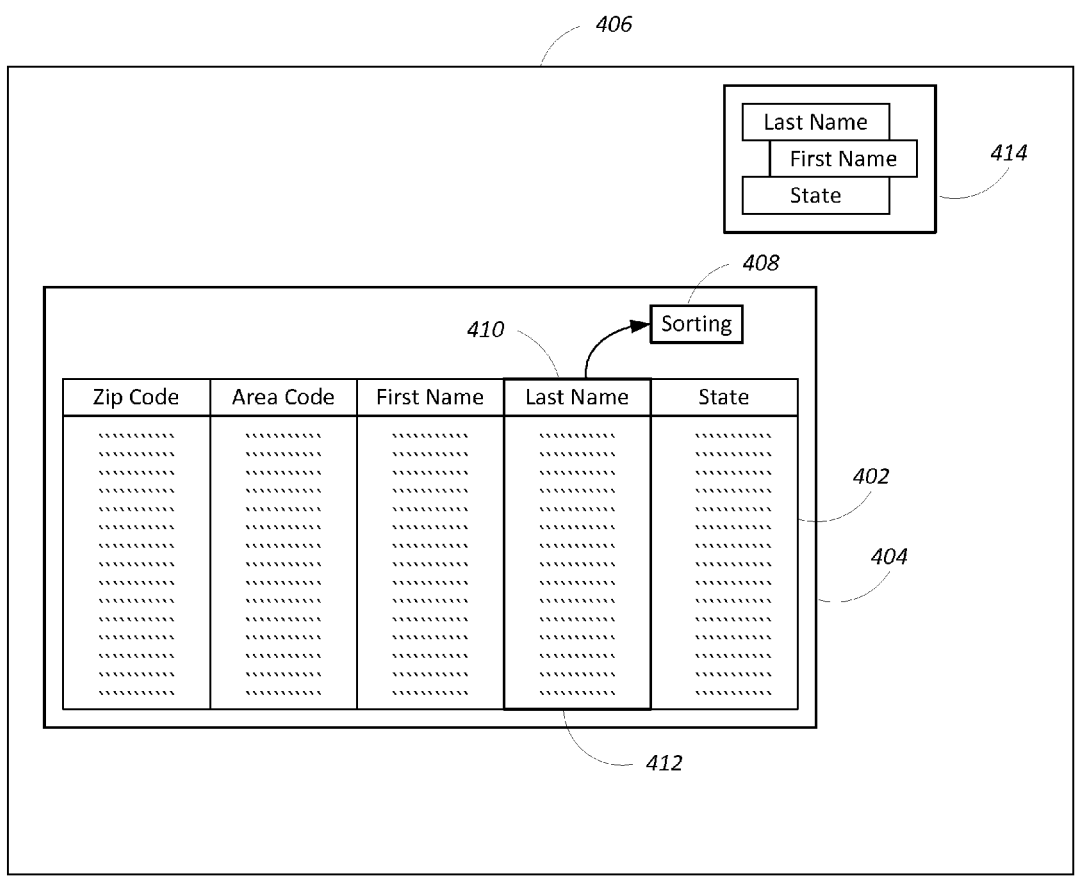
FIG. 4 shows a user interface design in accordance with the present invention.

In one alternative implementation, a sorting icon is displayed on the graphical user interface display. FIG. 4 shows a table of data 402 displayed in a window 404 on a graphical user interface display 406. To select a column for sorting, the user may drag a marker (described above) from the table of data to the "sorting" icon 408. In response to the drag-and-drop operation, the program determines whether the column 412 associated with the user-dragged marker (e.g., column header 410) is the most significant sort key. If so, the program changes the sort direction of the selected column 412 and sorts the table of data according to the sort key order. Otherwise, the program establishes the column 412 associated with the user-dragged marker 410 as the most significant sort key, maintains the positions and sort directions of the remaining sort keys in the sort key order, and sorts the table of data according to the sort key order.

As an alternative to indicating the sort key order by the distinct visual symbols described above, the sort key order can be depicted through the use of a box 414 in which the sort keys are displayed in order. Optionally, the sort keys displayed in the box 414 can be implemented to respond to a user action changing the order. After each such action, the changes made to the sort key order are reflected in the sort keys displayed in the box 414.

Optionally, a user can move the representations of the sort keys displayed in the box 414 using conventional drag-and-drop techniques. For example, the user may drag a representation of a sort key from its position in the sort key order to the top of the sort key order. In response to this user action, the program establishes the column associated with the user-dragged representation of the sort key as the most significant sort key, maintains the positions and sort directions of the remaining sort keys in the sort key order, and sorts the table of data according to the sort key order without any further action from the user.

In another implementation, the program displays a box on the graphical user interface display in which representations of the sort keys (e.g., column headers) are displayed in the sort key order. The user may move one or more markers (e.g., using conventional drag-and-drop techniques) from the displayed table to the box to select the associated columns or rows as sort keys. The placement of the marker (by the user) within the box dictates the position of the sort key associated with the marker in the sort key order.

In another alternative implementation, markers are collected in a palette in which they can be selected through the selecting or dragging gestures described above.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Other embodiments are within the scope of the following claims. For example, the steps of the invention can be performed in a different order and still achieve desirable results. The data can be sorted in rows using row headers rather than column headers as the interface elements with which the user interacts. The user can interact with other markers paired with columns or rows in the way described for interacting with column or row headers. The program may be configured to provide a sort direction indicator within (or alongside) a marker. For example, the program can be implemented to allow the user to indicate the sort direction of the sort key associated with the marker by selecting a checkbox (e.g., "ascending" if checkbox is selected; "descending" if checkbox is not selected). In the example shown in FIG. 4, the program is implemented to allow a user to slide a window marker to the left to indicate an ascending sort direction or to the right to indicate a descending sort direction for the sort key.

What is claimed is:

1. A system comprising:
one or more computers configured to perform operations comprising:
displaying a table of data having a plurality of columns;
accessing, from a memory resource, a sort key order having a plurality of sort keys and a predetermined maximum number of sort keys, wherein each of the sort keys in the sort key order has a position and a sort direction;
receiving an input selecting a displayed marker associated with a particular column of the plurality of columns, wherein the particular column is not associated with any of the plurality of sort keys;
determining whether the plurality of sort keys comprises fewer than the predetermined maximum number of sort keys;
if it is determined that the plurality of sort keys comprises the predetermined maximum number of sort keys, removing a least significant sort key from the sort key order in response to selecting the displayed marker, adding a new sort key associated with the particular column as a most significant sort key, and maintaining respective positions and sort directions of other remaining sort keys in the sort key order;
if it is determined that the plurality of sort keys comprises fewer than the predetermined maximum number of sort keys, adding a new sort key associated with the particular column as a most significant sort key, and maintaining respective positions and sort directions of other sort keys in the sort key order;
sorting the columns of the table of data according to the sort key order; and
displaying the sorted table of data.

2. The system of claim 1, wherein the input comprises a pointing device action on the marker.

3. The system of claim 1, wherein the input is a mouse click on the marker.

4. The system of claim 1, further configured to perform operations comprising:
representing the sort key order visually in the table of data by displaying the markers with a pattern of distinct visual properties.

5. The system of claim 4, wherein the pattern of distinct visual properties indicates the sort key order.

6. The system of claim 4, wherein the pattern of distinct visual properties comprises a set of distinct colors.

7. The system of claim 4, further configured to perform operations comprising displaying markers that are associated with sort keys with distinct background colors.

8. The system of claim 4, wherein the pattern of distinct visual properties comprises a set of distinct non-textual representations identifying the position of each sort key in the sort key order.

9. A method comprising:
displaying a table of data having a plurality of columns;
accessing, from a memory resource, a sort key order having a plurality of sort keys and a predetermined maximum number of sort keys, wherein each of the sort keys in the sort key order has a position and a sort direction;
receiving an input selecting a displayed marker associated with a particular column of the plurality of columns, wherein the particular column is not associated with any of the plurality of sort keys;
determining whether the plurality of sort keys comprises fewer than the predetermined maximum number of sort keys;
if it is determined that the plurality of sort keys comprises the predetermined maximum number of sort keys, removing a least significant sort key from the sort key order in response to selecting the displayed marker, adding a new sort key associated with the particular column as a most significant sort key, and maintaining respective positions and sort directions of other remaining sort keys in the sort key order;
if it is determined that the plurality of sort keys comprises fewer than the predetermined maximum number of sort keys, adding a new sort key associated with the particular column as a most significant sort key, and maintaining respective positions and sort directions of other sort keys in the sort key order;
sorting the columns of the table of data according to the sort key order; and
displaying the sorted table of data.

10. The method of claim 9, wherein the input comprises a pointing device action on the marker.

11. The method of claim 9, wherein the input is a mouse click on the marker.

12. The method of claim 9, further comprising:
representing the sort key order visually in the table of data by displaying the markers with a pattern of distinct visual properties.

13. The method of claim 12, wherein the pattern of distinct visual properties indicates the sort key order.

14. The method of claim 12, wherein the pattern of distinct visual properties comprises a set of distinct colors.

15. The method of claim 12, further comprising displaying markers that are associated with sort keys with distinct background colors.

16. The method of claim 12, wherein the pattern of distinct visual properties comprises a set of distinct non-textual representations identifying the position of each sort key in the sort key order.

17. A method comprising:
displaying a table having a plurality of columns receiving an input selecting a displayed marker associated with a particular column of the plurality of columns that is not associated with a sort key in a sort key order having a predetermined number of sort keys;

determining whether the table has the predetermined number of sort keys in the sort key order, if it is determined that the table of data has the predetermined number of sort keys, removing a least significant sort key from the sort key order responsive to the selection of the marker, adding the particular column associated with the selected marker to the sort key order as the most significant sort key, and maintaining respective positions and sort key directions of the remaining sort keys in the sort key order, and if it is determined that the table of data has fewer than the predetermined number of sort keys in the sort key order, adding the particular column associated with the selected marker as the most significant sort key, and maintaining the respective positions and the sort key directions of the remaining sort keys in the sort key order;

sorting the table according to the sort key order and the sort key directions; and displaying the sorted table.

18. The method of claim 17, wherein each marker of the set of markers corresponds to a column header.

* * * * *